United States Patent Office 3,833,622
Patented Sept. 3, 1974

3,833,622
CRYSTALLINE 25-HYDROXYCHOLECALCIFEROL HYDRATE AND STRUCTURALLY RELATED COMPOUNDS
John C. Babcock and J Allan Campbell, Kalamazoo, Mich., assignors to The Upjohn Company, Kalamazoo, Mich.
No Drawing. Filed Mar. 17, 1969, Ser. No. 807,929
Int. Cl. C07c 171/10
U.S. Cl. 260—397.2   13 Claims

ABSTRACT OF THE DISCLOSURE

This invention relates to 25-hydroxycholecalciferol, a biologically active metabolite of Vitamin D, and especially to its hydrate and structurally related compounds possessing Vitamin D activities and uses.

SUMMARY OF THE INVENTION

This invention relates to and has as its object the provision of novel physiologically active steroids, methods for their production, and novel intermediates useful in said production. More particularly, this invention relates to production of steroids of the formula

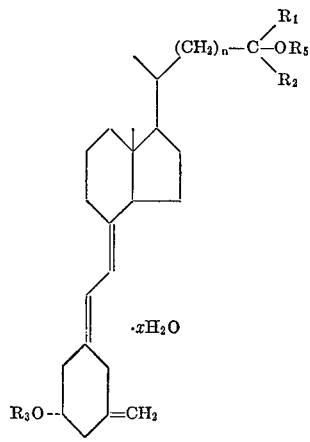

wherein $R_1$ and $R_2$ are the same or different radicals selected from the group consisting of hydrogen, alkyl of less than 9 carbon atoms, and phenyl; $R_3$ and $R_5$ are selected from the group consisting of hydrogen and lower acyl; $n$ is an integer, selected from the group consisting of 2, 3 and 4; and $x$ is a whole or simple fractional number between 0 and 2, inclusive, i.e., 0, ½, 1, 1½ and 2.

Of compounds covered by the formula above, all are novel with the exception of 25-hydroxycalciferol, i.e., where $R_1$ and $R_2$ are methyl, $n$ is 3, $x$ is 0, and $R_3$ and $R_5$ are hydrogen. Of the novel compounds, the hydrates and other structural derivatives possess the activities and uses described below and the advantages over 25-hydroxycalciferol that are obvious and inherent, which will be appreciated from the following specification.

The acyl radicals preferred in this invention are those of hydrocarbon carboxylic acids of less than 12 carbon atoms as exemplified by the lower alkanoic acids (e.g., acetic, propionic, butyric, and tert-pentanoic acid), the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids. The alkyl radicals are those of hydrocarbon alkyl radicals of less than 9 carbon atoms as exemplified by the lower alkyl radicals (e.g., methyl, ethyl, propyl, isopropyl, butyl, octyl) and the lower cycloalkyl radicals (e.g., cyclopropyl, cyclopentyl, cyclohexyl).

The final products of this invention are physiologically active steroids and possess Vitamin D-like activity, i.e., they promote the intestinal reabsorption of calcium and the mobilization of calcium from bone. The final products of this invention may be used in place of and as substitutes for Vitamin D substances in the treatment of such conditions as chronic renal failure, hypoparathyroidism, secondary hyperparathyroidism, osteomalacia, rickets, corticoid-induced osteoporosis, post-menopausal osteoporosis, etc.

A further object of this invention is to provide a method and compositions for the prevention of osteoporosis during treatment with corticosteroids employing the final products of this invention.

The compounds of this invention may be prepared by the processes of this invention beginning with a 3-hydroxychola-5,7-dienic acid (I) and its functional derivatives as shown in the following equations. The choladienic acids (I) if desired may be prepared from the corresponding chol-5-enic acids (VII) by bromination and dehydrobromination as described by Fieser and Fieser, Steroids, Reinhold Publishing Corporation, New York (1959), pages 157–161. The bromination is commonly accomplished in an inert solvent (e.g., carbon tetrachloride, chloroform, methylenechloride, benzene, petroleum ether), with an allylic brominating agent, e.g., N-bromsuccinimide, N-bromacetamide, 1,3,-dibromo-5,5-dimethylhydantoin, etc. Dehydrobromination may be accomplished with an organic base such as collidine or with a trialkylphosphite such as trimethylphosphite in an inert high boiling solvent such as xylene. Preferably the bromination and dehydrobromination are accomplished by the method described by Hanziker and Müllner, Helv. Chim. Acta, 41, 70 (1958).

The processes of this invention may be represented by the following equations:

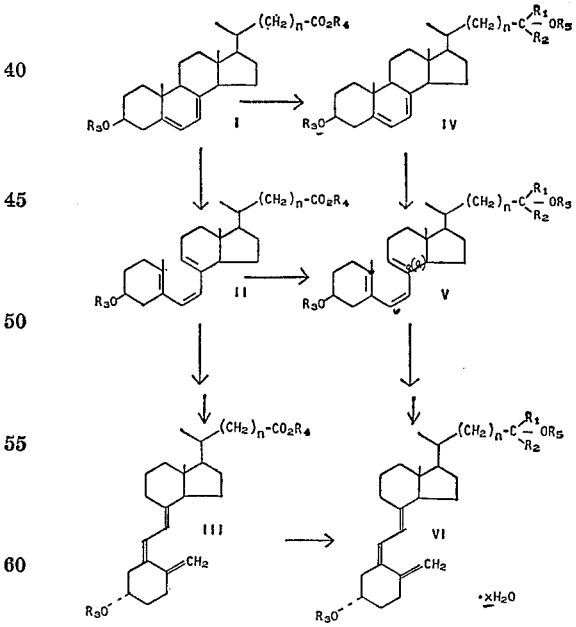

In compounds of Formulas I–III, $R_4$ is selected from the group consisting of hydrogen and lower alkyl of less than 9 carbon atoms. The values of $x$, $n$, $R_1$, $R_2$, $R_3$ and $R_5$ in the above equations are as defined above.

In the first step of the process of this invention, a functionally substituted 3-hydroxychola-5,7-dienic acid (I) preferably in the form of its methyl ester acetate or methyl ester 3-tetrahydropyranyl ether is treated with an alkyl magnesium halide ($R_1$MgX) wherein X is chloride, bromide or iodide (for example, methyl magnesium bromide, ethyl magnesium chloride, propyl magnesium iodide) or with a lower alkyl lithium (such as methyl lithium) to afford a compound of structure IV wherein $R_1$ and $R_2$ are the same. A compound of structure IV is irradiated by methods known in the art for the conversion of 7-dehydrocholesterol to Vitamin $D_3$ and ergosterol to Vitamin $D_2$ using actinic radiation including wave lengths near 280 m$\mu$ to afford a 9,10-seco steroid triene of structure (V). Preferably, and when desired to obtain V in relatively pure form, the temperature of the irradiation reaction is maintained below 50°. The 9,10-seco steroid triene of structure V is then heated at temperatures above 50° preferably 60°–90°, isomerizing the double bond in V to afford an equilibrium mixture of V and VI. The equilibrium mixture of V and VI consists of at least 50% of VI, and in favorable cases of 75% or more.

The compound of structure VI is purified and separated from the compound of structure V and other double bond isomers by crystallization of its hydrate and by chromatography. Those chromatographic adsorbents which can be used include magnesium silicate, alumina, silicic acid or silica gel. Those chromatographic fractions containing the compound of structure VI relatively free of impurities are combined and recrystallized from a solvent containing water. An essential part of this invention is the discovery that 25-hydroxycholecalciferol and other compounds of structure VI can be crystallized as their hydrates and purified by crystallization, whereas the anhydrous 25-hydroxycholecalciferol, isolated by Blunt et al. (Biochem. 7, 3317, 1968), required purification by complex silicic acid adsorption chromatography (Lun and De Luca, J. Lipid Res, 7, 739, 1966) and was obtained as an oil.

We have thus found that compounds of structure VI are very difficult to crystallize as anhydrous materials but may be readily crystallized and purified as their hydrates. Thus, 25-hydroxycholecalciferol (VI) cannot be obtained crystalline from anhydrous solvents such as anhydrous methanol, anhydrous ethanol, ether, methylene chloride, anhydrous acetone, petroleum ether, ethyl acetate and the like. However, on addition of water, both to water miscible and water immiscible solvents, 25-hydroxycholecalciferol hydrate is readily obtained. Crystalline 25-hydroxycholecalciferol hydrate and other hydrates of compounds of structure VI contain between 0.5 and 2.0 moles of water, and, while exhibiting the same biological properties as the anhydrous compounds of structure VI, are more readily purified, and are more stable and less sensitive to autoxidation.

Anhydrous 25-hydroxycholecalciferol (VI) and other compounds of structure VI can be obtained from their hydrates. Thus, a solution of 25-hydroxycholecalciferol hydrate and other hydrates of compounds of structure VI in an organic solvent (e.g., methylene chloride, ether, ethylacetate, benzene, and the like) are dried with a drying agent (e.g., sodium sulfate, magnesium sulfate, calcium carbonate, molecular sieves), filtered, and evaporated at temperatures below 80° to afford a noncrystalline residue of the anhydrous compounds of structure VI. Alternatively, hydrates of compounds of structure VI are dried by extended heating at temperatures below 85° under high vacuum to afford noncrystalline residues of the anhydrous compounds of structure VI. Hydrates of compounds of structure VI are also dried by prolonged desiccation in a desiccator containing a drying agent, preferably a non-acidic drying agent (e.g., potassium hydroxide), to give the noncrystalline anhydrous compounds of structure VI.

In carrying out the process of this invention it is necessary to elaborate the side chain of compound VI and convert the 5,7-diene system of compound I to the rearranged 9,10-secotriene system of structure VI. It is convenient and a preferred embodiment of this invention to proceed from I→IV→V→VI. However, the sequence is not critical and can be varied. Thus, a 3-hydroxychola-5,7-dienic acid (I) and its functional derivatives (I) can first be irradiated at temperatures not exceeding 50° as described above to afford a 9,10-secotriene of structure II. Heating at temperatures above 50° affords the rearranged 9,10-secotrienes of structure III. Treatment of compounds of structure III with an alkyl or aryl magnesium halide or an alkyl lithium as described for the conversion of I→IV, above, affords the compounds of structure VI which can be purified by chromatography and by conversion to their hydrates. Alternatively, the 9,10-secotrienes of structure II can be treated with an alkyl or aryl magnesium halide or an alkyl lithium as described above at temperatures not exceeding 50° to afford a 9,10-secotriene of structure V, which can be converted as described above to compounds of structure VI and the corresponding hydrates thereof. Compounds of structures IV–VI where $R_1=R_2=H$ are prepared from compounds of structures I–III by reduction with lithium aluminum hydride. Further, compounds of structure IV are produced from compounds of structure VIIb by bromination and dehydrobromination as described for I, above.

In the above described processes, elaboration of the side chain in compounds of structures IV–VI (e.g., I→IV, II→V, III→VI) affords compounds wherein both groups $R_1$ and $R_2$ are the same and are lower alkyl, hydrogen or phenyl.

To prepare compounds of structure VI where $R_1 \neq R_2$, it is necessary to introduce functions $R_1$ and $R_2$ in separate stages, rather than in a single step. Thus, a 3$\beta$-hydroxychol-5-enic

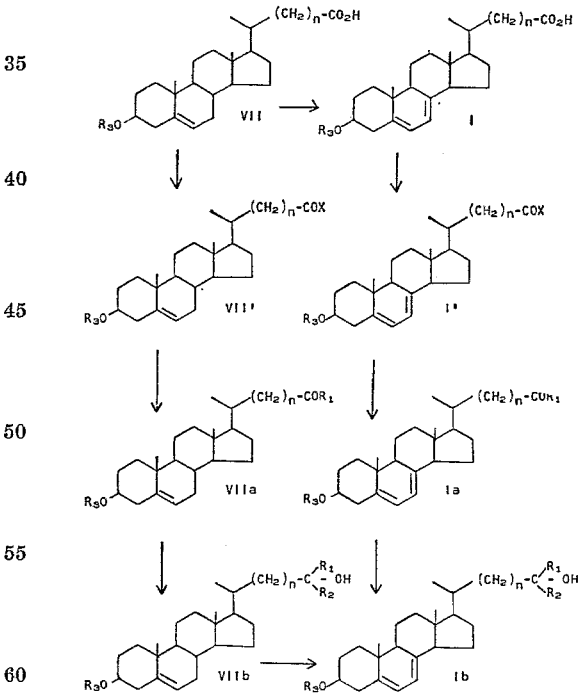

acid (VII) and a 3$\beta$-hydroxychola-5,7-dienic acid (I) functionally substituted at $C_3$ with a lower alkyl or aryl carboxylic acid (or optionally, a tetrahydropyranyl ether or a trimethylsilyl ether) is treated with a reagent selected from the group consisting of thionyl chloride, thionyl bromide, phosphorous trichloride, phosphorous tribromide, phosphorous oxychloride, oxalylchloride, and the like (as described by Wagner and Zook, Synthetic Organic Chemistry, John Wiley and Sons, New York, 1953, pages 546–557) to afford the acid chloride or acid bromide (VII' and I') of VII and I, respectively. The acid chloride or acid bromide (VII' and I') is then treated with a dialkyl cadmium [$(R_1)_2$Cd] according to the procedure described by Riegel and Kaye, J. Am. Chem.

Soc. 66, 723 (1944) to produce the corresponding alkyl ketones VIIa and Ia, respectively. Treatment of VIIa and Ia with an alkyl or phenyl magnesium halide ($R_2MgX$), with an alkyl lithium (e.g., $CH_3Li$) or with lithium aluminum hydride as described for compounds I, II and III, above, affords the corresponding compounds of structures VIIb and Ib, respectively. Appropriate selection of the successive alkylating agents will produce in VIIb and IV compounds in which $R_1$ and $R_2$ are different.

In these transformations, when $R_3$ is lower acyl (e.g., acetyl), the acylate group reacts with the alkyl or aryl magnesium halide, alkyl lithium or lithium aluminum hydride, and is removed affording compounds of structures IV, V and VI, respectively, wherein $R_3$ is H. If, however, in this transformation, $R_3$ is H or is an ether function such as tetrahydropyranyl or trimethylsilyl, $R_3$ is not changed. When $R_3$ is tetrahydropyranyl or trimethylsilyl, the amount of alkyl or aryl magnesium halide or alkyl lithium required to produce useful conversions of I→IV, II→V, and III→VI is reduced by 50% from that required when $R_3$ is H. This functional variant of $R_3$ is especially useful in preparing compounds of structure VI wherein the group $R_1$, $R_2$ or both are labelled with $^{14}C$ or with $^3H$ as when $R_1$ and $R_2$ are $^{14}CH_3$ as in 25,26-$^{14}C$25-hydroxycholecalciferol (VI). The thus produced ethers of compounds of structures IV, V and VI are solvolyzed to the corresponding compounds of structures IV, V and VI wherein $R_3$ is H by treating them in solution in an organic hydroxylic solvent (e.g., methanol) with a weak acid (e.g., acetic acid, formic acid, p-toluenesulfonic acid) until the ether group is removed. Optionally, water or a Lewis base (e.g., dimethylformamide) may also be present. Although the above ethers can also be converted to the alcohols (IV, V and VI) wherein $R_3$ is H using a strong acid, care must be used to avoid dehydration of the tertiary hydroxyl group in the side chain and rearrangement of the nuclear double-bonds, and the solvolysis is preferably carried out at lower temperatures (e.g., not exceeding 40°) and should be terminated as soon as analysis (e.g., thin-layer chromatography [TLC]) indicates that the solvolysis is essentially complete.

Compounds of structures I–VI wherein $R_3$ is H can be esterified to give compounds of structures I–VI wherein $R_3$ is lower acyl by reaction with an excess of a lower acyl anhydride or a lower acyl halide (e.g., acetyl anhydride, acetyl chloride, propionic anhydride, octanoic anhydride, cyclopentylpropionyl chloride and the like) preferably in the presence of a tertiary organic base (e.g., pyridine, triethylamine) and at 0°–60°. Where desired, the esterification can be conducted in an inert solvent, all in accord with esterification methods known in the art. In compounds of structures IV–VI where $R_3$ and $R_5$ are hydrogen, two hydroxyl groups are present and when $R_1$ and $R_2$ are lower alkyl or phenyl, the above esterification converts only $R_3$ to the ester group. When the temperature of the above esterification is elevated to 65°–100°, however, both $R_3$ and $R_5$ are converted to the ester group, even when $R_1$ and $R_2$ are lower alkyl or phenyl. When one or more of the groups $R_1$ and $R_2$ are hydrogen, the above esterification also converts both $R_3$ and $R_5$ to the ester group. However, when approximately one equivalent of an acyl inhydride or an acyl halide is used instead of an excess, there are produced compounds of the structures IV–VI wherein one of the groups $R_3$ and $R_5$ is hydrogen and one is acyl, i.e., the monoester. These products can be separated and purified by chromatography over Florisil (magnesium silicate) or silica gel, and the resulting products are usually fairly evenly divided between the 3-monoester and the 25-monoester.

Compounds of structures I–VI wherein $R_3$ is lower acyl are hydrolyzed to compounds of structures I–VI wherein $R_3$ is H by methods known in the art. Compounds of structures I–VI are somewhat sensitive to acid and can decompose when excessive acid or excessive temperatures are applied, so it is preferred to use the known basic hydrolysis conditions. Thus, compounds of structures I–VI wherein $R_3$ is lower acyl are converted to compounds of structures I–VI wherein $R_3$ is H by treatment with a strong base in an hydroxylic organic solvent. Suitable bases include sodium methoxide, sodium hydroxide, potassium hydroxide, barium hydroxide, sodium carbonate, potassium bicarbonate and the like. Suitable solvents include methanol, ethanol, isopropanol, aqueous tetrahydrofuran, aqueous tert-butyl alcohol, and the like. In the conversion of compounds of structures I–III wherein $R_3$ is lower acyl and $R_4$ is lower alkyl to compounds of structures I–III wherein $R_3$ is H, it is preferred to use as a base the sodium salt of the alcohol $R_4OH$ and as solvent, the alcohol $R_4OH$, to avoid modifying the side chain. When both $R_3$ and $R_5$ in structures IV–VI are lower acyl and $R_1$ and $R_2$ are lower alkyl or phenyl, the extent of hydrolysis may be followed by TLC and interrupted when $R_3$ has been converted to H, leaving $R_5$ as lower acyl. For this purpose, the preferred bases are sodium or potassium bicarbonate and sodium or potassium carbonate.

The tetrahydropyranyl ethers and trimethylsilyl ethers of compounds of structures I–III are prepared from the corresponding compounds of structures I–III wherein $R_3$ is H by known etherification reactions using dihydropyran and an acid catalyst under mild conditions terminated as soon as etherification is complete to obtain the tetrahydropyranyl ethers and using trimethylsilyl chloride and an amine or hexamethyldisilazane to obtain the trimethylsilyl ethers.

Acids of structures I–III (4 is H) are converted to esters of structures I–III ($R_4$ is lower alkyl) by methods known in the art, especially by the reaction of the acid with a diazoalkane or with an alcohol in the presence of an esterification reagent, and the esters can be recovered from the reaction mixture and separated by chromatographic methods as previously described.

The products of this invention, i.e., compounds of structure VI and their hydrates, are useful as vitamin and nutritional factors in humans and all species in the veterinary field and are useful in place of and in combination with Vitamins $D_2$, $D_3$ and $D_4$, in the vitamin and nutritional treatment of birds, mammals and man. Birds are not effectively treated by Vitamins $D_2$ and $D_4$. Compounds of structures VI and their hydrates are therefore much more effective than Vitamins $D_2$ and $D_4$ in birds. Potency of compounds of structure VI and their crystalline hydrates is determined by the line test method (U.S. Pharmacopeia, 1955, XV, 14th revision, Easton, Pa., Mack, pg. 889) and expressed in terms of International Units (I.U.). Compounds of structure VI and their hydrates are substituted for Vitamins $D_2$, $D_3$ and $D_4$ in birds, mammals, and man on the basis of comparable international units in common unit dosage forms, e.g., compressed tablet, coated tablet, hard or soft elastic gelatin capsules, in propylene glycol solution, oil solution, aqueous suspension, in fortified foods, and the like. In addition, pre-mixes suitable for fortifying foods for bird, mammal and human consumption can be prepared using compounds of structure VI and their hydrates. Suitable routes of administration include oral, buccal and parenteral (intramuscular, subcutaneous, and intravenous).

Our discovery of the hydrate forms of the dihydroxy compounds of structure VI and methods of making them are a valuable aspect of our invention. These crystalline forms separate readily from reaction mixtures or from solutions as illustrated in the following examples. They provide a means of purification and clean separation of such compounds of structure VI from mixtures containing a wide variety of organic or inorganic contaminants. They are active in all essential characteristics in the same manner as the anhydrous materials, e.g., anhydrous 25-hydroxycholecalciferol, and can be used as full and complete replacements therefor. They thus afford the additional advantage of obviating the tedious, expensive, and otherwise disadvantageous methods of separation and purification of the products in anhydrous form. They also provide an intermediate form of dihydroxy compounds VI from which the corresponding anhydrous VI can be made as previously shown.

Compounds of structure VI and hydrates of compounds of structure VI are particularly useful in treating conditions characterized by low serum levels of 25-hydroxycholecalciferol, especially where those low levels result from an inability or an impaired ability to convert Vitamin $D_3$ to its biologically active metabolite, 25-hydroxycholecalciferol (VI). These conditions include among others Vitamin D-resistant rickets with hypophosphatemia, chronic renal disease, corticoid-induced decrease in calcium absorption, corticoid-induced osteoporosis, senile decrease in calcium absorption, hyperparathyroidism, alcoholism and the like.

Compounds of structure VI and hydrates of compounds of structure VI are also useful in those patients who exhibit a variable and frequently excessive response to Vitamin $D_3$, sometimes even showing hypercalcemia, where endogenous production of 25-hydroxycholecalciferol is variable or excessive. In such patients, the compounds of structure VI and their hydrates afford a reproducible and predictable response.

Compounds of structure VI and their hydrates are particularly useful in preventing and reversing corticosteroid-induced decrease in intestinal absorption of calcium. Patients, both animal and human, treated with corticosteroids in pharmacological doses for extended periods, usually go into negative calcium balance and develop osteoporosis. When compounds of structure VI and hydrates of compounds of structure VI are administered simultaneously with corticosteroids either by separate administration of each agent in unit dosage form or by administration of a pharmaceutical composition containing both agents in a single unit dosage form, the undesirable impairment of calcium absorption and the harmful consequent effects of excessive parathyroid hormone production are decreased or prevented. Chronic administration of corticoids is of particular value in patients with arthritis and other inflammatory conditions and these conditions are commonly encountered in the geriatric patient least able to withstand further deprivation of an already compromised absorption of calcium. In these situations the corticoid-induced calcium imbalance and corticoid-induced osteoporosis can be specifically alleviated by use of compounds of structure VI or their hydrates.

In one method for preventing corticosteroid-induced changes in calcium absorption, dosages can be established as follows. A patient is treated with Vitamin D in dosage adequate to provide normal intestinal transport of calcium. Serum levels of 25-hydroxycholecalciferol are then determined (e.g., by methods described by Avioli, J. Clin. Inv. 46, 983, 1968, and J. Clin. Endocrinol. 28, 1341, 1968) at a prescribed time. Subsequently, a corticosteroid is administered in the dosage required to produce the desired corticosteroid effect. Then, the compound of structure VI or its hydrate is administered and its levels in serum again determined at the same time. The dose of VI or its hydrate which would provide effective serum levels comparable to those established prior to corticosteroid therapy can then be calculated. The corticosteroid and compound of structure VI or its hydrate are then administered in the thus established dosages either as separate entities or as an appropriate comparable fixed dosage composition thereof.

In place of establishing the appropriate dose of VI or its hydrate by measurement of serum concentrations of 25-hydroxycholecalciferol (VI) as described above, dosage can be determined by calcium balance studies or strontium studies as are known in the art or by measurement of serum parathyroid hormone concentrations by presently known immunological methods.

Compositions of corticosteroids and VI or its hydrate, particularly 25-hydroxycholecalciferol or its hydrate are encompassed by this invention. Suitable corticosteroids include: hydrocortisone, cortisone, prednisolone, prednisone, methylprednisolone, fluprednisolone, and the 9α-fluoro derivatives thereof; 9α-fluoro-16α-methylprednisolone; 9α-fluoro-16β-methylprednisolone; 9α-fluoro-16α-hydroxyprednisolone, 6α-methyl-9α-fluoro-16α-hydroxyprednisolone, 6α,9α-difluoro-16α-hydroxyprednisolone, and the corresponding acetonides thereof; known 21-acetates and 21-acylates of the above corticosteroids; 9α-fluoro-16β-methylprednisolone 17-valerate; and the like. Suitable doses include ½–2 times those commonly used systemically in man and animal and generally considered equivalent to prednisolone at dosages of 2.5 to 100 mg./day orally in man. Dosage of VI or its hydrate can range from 200 I.U. to 20,000 I.U., the higher doses ordinarily being used for correction of established calcium imbalance and the lower doses for prevention.

Compounds of formula VI or the hydrates at a molar concentration of $10^{-6}$ to $10^{-10}$ cause the release of calcium from bone maintained according to known techniques in organ culture (in vitro). The thus-produced release of bone calcium into the organ culture medium can be quantitated by measurement of the increase in concentration of soluble calcium. Candidate compounds which inhibit the thus induced release of calcium are of research and clinical interest because of their potential use in preventing osteolysis. Compounds of formula VI or the hydrates are thus useful in assaying compounds for antiosteolytic activity.

The invention can be illustrated by the following examples, all temperatures being in degrgees centigrade and NMR data being in δ units determined on a 60 megacycle instrument and with tetramethylsilane as internal standard. The numbers in parentheses indicate exemplary species falling within the generic formulas I to VII.

EXAMPLE 1

3β-Hydroxychol-5-enic acid 3-acetate (VII)

A solution of 95.8 g. of 3β-hydroxychol-5-enic acid (VII) in 600 ml. of pyridine is cooled in an ice bath. Slowly with stirring 100 ml. of acetic anhydride is added, keeping the temperature at 10° or lower. The mixture is stirred overnight at room temperature and is diluted with 25 ml. of water. After about 1 hour, the mixture is poured into 750 ml. of concentrated hydrochloric acid diluted to 2500 ml. with crushed ice. The crude product is filtered, washed thoroughly, and dried to give 104.3 g. of crude acetate. Ninety grams of the acetate is dissolved in 450 ml. of warm acetic acid plus 100 ml. of methylene chloride and filtered. The solution is allowed to cool slowly to room temperature to afford large crystals. The product is filtered, dried under suction and washed with water to give 49 g. of 3β-hydroxychol-5-enic acid 3-acetate (VII) as a crystalline solid, m.p. 178–186°.

In like manner, but substituting for acetic anhydride, the following: propionic anhydride, isobutyric anhydride, hexanoic anhydride, benzoic anhydride, cyclohexylacetic anhydride and the like, there are produced 3β-hydroxychol-5-enic acid 3-propionate, 3β-hydroxychol-5-enic acid 3-isobutyrate, 3β-hydroxychol-5-enic acid 3-hexanoate, 3β-hydroxychol-5-enic acid 3-benzoate, 3β-hydroxychol-5-enic acid 3-cyclohexylacetate, and the like, respectively.

EXAMPLE 2

3β-Hydroxychol-5-enic acid chloride 3-acetate (VII')

A slurry of 60 g. of 3β-hydroxychol-5-enic acid 3-acetate (VII) in 1.13 l. of benzene and 2.3 ml. of pyridine is cooled in an ice bath for ½ hour during dropwise addition of 60 ml. of thionyl chloride. After 2½ hours, the solution is concentrated to near dryness, benzene is added, and the solution is concentrated again. This process is repeated several times to remove any thionyl chloride and hydrochloric acid affording a residue of 3β-hydroxychol-5-enic acid chloride 3-acetate (VII').

In like manner, but substituting for 3β-hydroxychol-5-enic acid 3-acetate (VII) the following:

3β-hydroxychol-5-enic acid 3-propionate (VII),
3β-hydroxychol-5-enic acid 3-isobutyrate (VII),
3β-hydroxychol-5-enic acid 3-hexanoate (VII),
3β-hydroxychol-5-enic acid 3-benzoate (VII),
3β-hydroxychol-5-enic acid 3-cyclohexylacetate (VII),
3β-hydroxy-25-homochol-5-enic acid 3-acetate (VII), and the like, there are produced 3β-hydroxychol-5-enic acid chloride 3-propionate (VIII'),
3β-hydroxychol-5-enic acid chloride-3-isobutyrate (VII'),
3β-hydroxylchol-5-enic acid chloride 3-hexanoate (VII'),
3β-hydroxychol-5-enic acid chloride 3-benzoate (VII'),
3β-hydroxychol-5-enic acid chloride 3-cyclohexylacetate (VII'),
3β-hydroxy-25-homochol-5-enic acid chloride 3-acetate (VII'), and the like.

EXAMPLE 3

Methyl 3β-hydroxy-25-homochol-5-enate 3-acetate (VII)

A solution of 400 ml. of 22.5% aqueous potassium hydroxide is cooled in an ice bath. Ether (600 ml.) is added, followed, in small portions while swirling, with 50 g. of N-nitro-N-nitroso-N'-methylguanidine. The ether phase is separated and the alkaline phase is washed with 300 ml. of ether. The combined ether layers containing diazomethane are dried over potassium hydroxide. The preparation is carried out three times and the diazomethane solutions are combined.

The residue of 3β-hydroxychol-5-enic acid chloride 3-acetate (VII') obtained as in Example 2 is dissolved in 600 ml. of benzene, filtered through glass wool and added dropwise to the stirred, ice-cold solution of diazomethane in ether. The solution is allowed to stand for 30 minutes after the addition is completed and is concentrated on a rotary evaporator to give a residue. The residue (78 g.) containing the expected diazoketone ($\nu$ 2100 cm.$^{-1}$) is dissolved in 700 ml. of methylene chloride and 935 ml. of methanol and is stirred at room temperature. A solution of 5 g. of silver benzoate in 50 ml. of triethylamine is added in about 0.5 ml. portions at intervals often enough to maintain evolution of gas according to the method of Newman and Beal, J. Amer. Chem. Soc. 72 5163 (1950). After the reaction is complete as judged by thin layer analysis (about half of the silver benzoate solution is added), water is added and the product is extracted with methylene chloride. The extract is washed with dilute hydrochloric acid, water and sodium bicarbonate solution and again with water. The extract is dried over sodium sulfate, filtered and concentrated to a solid containing the crude ester VII. The crude ester is chromatographed through a 3 kg. Florisil column. The column is eluted by gradient elution between Skellysolve B hexanes and 10% ethyl acetate-Skellysolve B hexanes using about 65 l. of solvent. The fractions containing pure methyl 3β-hydroxy-25-homochol-5-enate 3-acetate (VII) are combined and recrystallized from methylene chloride-methanol: yield 44 g., m.p. 110–112.5, [α]$_D$ −45° (CHCl$_3$).

Analysis.—Calcd. for $C_{28}H_{44}O_4$: C, 75.63; H, 9.97. Found: C, 75.45; H, 9.83.

In like manner, but substituting for 3β-hydroxychol-5-enic acid chloride 3-acetate (VII') the following:

3β-hydroxychol-5-enic acid chloride 3-propionate (VII'),
3β-hydroxychol-5-enic acid chloride 3-isobutyrate (VII'),
3β-hydroxychol-5-enic acid chloride 3-hexanoate (VII'),
3β-hydroxychol-5-enic acid chloride 3-benzoate (VII'),
3β-hydroxychol-5-enic acid chloride 3-cyclohexylacetate (VII'),
3β-hydroxy-25-homochol-5-enic acid chloride 3-acetate (VII'), and the like, there are produced:

methyl 3β-hydroxy-25-homochol-5-enate 3-propionate (VII),
methyl 3β-hydroxy-25-homochol-5-enate 3-isobutyrate (VII),
methyl 3β-hydroxy-25-homochol-5-enate 3-hexanoate (VII),
methyl 3β-hydroxy-25-homochol-5-enate 3-benzoate (VII),
methyl 3β-hydroxy-25-homochol-5-enate 3-cyclohexylacetate (VII),
methyl 3β-hydroxy-25,26-bis-homochol-5-enate 3-acetate (VII), and the like.

In like manner, but substituting for methanol the following: ethanol, isopropanol, propanol, n-butanol, isooctanol, cyclohexanol, and the like, there are produced ethyl 3β-hydroxy-25-homochol-5-enate 3-acetate (VII),
isopropyl 3β-hydroxy-25-homochol-5-enate 3-acetate (VII),
propyl 3β-hydroxy-25-homochol-5-enate 3-butyrate (VII),
n-butyl 3β-hydroxy-25-homochol-5-enate 3-benzoate (VII),
isooctyl 3β-hydroxy-25-homochol-5-enate 3-hexanoate (VII),
cyclohexyl 3β-hydroxy-25-homochol-5-enate 3-acetate (VII),
ethyl 3β-hydroxy-25,26-bishomochol-5-enate 3-acetate (VII), and the like.

EXAMPLE 4

Methyl 3β-hydroxy-25-homochola-5,7-dienate 3-acetate (I)

A solution of 2.22 g. of methyl 3β-hydroxy-25-homochol-5-enate 3-acetate (VII) in 20 ml. of petroleum ether, and 15 ml. of benzene is heated at reflux and 0.82 g. of 1,3-dibromo-5,5-dimethylhydantoin is added. The solution is refluxed for ½ hour and cooled, and the precipitate of 5,5-dimethylhydantoin is filtered. The filtrate is concentrated under reduced pressure to give a crude 7-bromo compound as a heavy oil. The oil is dissolved in 8 ml. of xylene (dried over a molecular sieve) and is added dropwise to a refluxing solution containing 2 ml. of trimethylphosphite in 10 ml. of xylene. The solution is heated under nitrogen for 1 hour and the solvent is removed to give a residue. The residue is chromatographed through 200 g. of Florisil, using gradient eluation between 5 l. of Skellysolve B hexanes and 5 l. of 10% ethylacetate in Skellysolve B hexanes and collecting 400 ml. fractions. The fractions are assayed by TLC on silica gel plates impregnated with silver nitrate. Those fractions containing the product are combined and recrystallized from methylene chloride-methanol: yield 260 mg. of methyl 3β-hydroxy-25-homochola-5,7-dienate 3-acetate (I), m.p. 130–134°, $\lambda^{alc}_{max.}$ 271 (ε=10,450), 282 (ε=11,000), 293 mμ (ε=6,250);

I.R. 1735 (C=O), 1650, 1600 cm.$^{-1}$ (C=C), NMR (CDCl$_3$), δ 0.62 (C-18-H$_3$), 0.96 (C-19-H$_3$), 0.98 (d, C-21-H$_3$), 2.08 (COCH$_3$), 3.67 (OCH$_3$), 5.52 (q, J=6 cps., C-6 and C-7-H$_2$).

Analysis.—Calcd. for $C_{28}H_{42}O_4$ (432.54): C, 75.97; H, 9.56. Found: C, 75.73; H, 9.47.

In like manner, but substituting for methyl 3β-hydroxy-25-homochol-5-enate 3-acetate (VII) the following:

methyl 3β - hydroxy-25-homochol-5-enate 3-propionate (VII),
methyl 3β - hydroxy-25-homochol-5-enate 3-isobutyrate (VII), methyl 3β-hydroxy-25 - homochol-5-enate 3 - hexanoate (VII),
methyl 3β - hydroxy-25 - homochol-5-enate 3-benzoate, (VII),
methyl 3β - hydroxy-25-homochol-5-enate 3-cyclohexylacetate (VII),
methyl 3β-hydroxy-25,26 - bischomochol-5-enate 3-acetate (VII),
methyl 3β-hydroxychol-5-enate 3-acetate (VII),
ethyl 3β-hydroxy-25-homochol-5-enate 3- acetate (VII),
isopropy 3β - hydroxy-25-homochol-5-enate 3 - acetate (VII),
propyl 3β - hydroxy - 25 - homochol-5-enate 3 - butyrate (VII),
n-butyl 3β - hydroxy-25-homochol-5-enate 3 - benzoate (VII),
isooctyl 3β - hydroxy-25-homochol-5-enate 3 - hexanoate (VII),
cyclohexyl 3β - hydroxy-25-homochol-5-enate 3 - acetate (VII),
ethyl 3β - hydroxy-25,26-bishomochol-5-enate 3 - acetate (VII),
and the like, there are produced:

methyl 3β - hydroxy-25-homochola-5,7-dienate 3 - propionate (I),
methyl 3β-hydroxy-25-homochola-5,7-dienate 3- isobutyrate (I),
methyl 3β - hydroxy-25-homochola-5,7-dienate 3-hexanoate (I),
methyl 3β-hydroxy-25-homochola-5,7-dienate 3-benzoate (I),
methyl 3β - hydroxy-25-homochola-5,7-dienate 3 - cyclohexylacetate (I),
methyl 3β - hydroxy-25,26-bishomochola-5,7-dienate 3-acetate (I),
ethyl 3β - hydroxy-25-homochola-5,7-dienate 3 - acetate (I),
isopropyl 3β - hydroxy-25-homochola-5,7-dienate 3-acetate (I),
propyl 3β-hydroxy-25-homochola-5,7-dienate 3 - butyrate (I),
n-butyl 3β - hydroxy-25-homochola-5,7-dienate 3-benzoate (I),
isooctyl 3β-hydroxy-25-homochola-5,7-dienate 3-hexanoate (I),
cyclohexyl 3β - hydroxy - 25 - homochola-5,7-dienate 3-acetate (I),
ethyl 3β - hydroxy - 25,26 - bishomochola-5,7-dienate 3-acetate (I),
and the like.

EXAMPLE 5

Methyl 3β-hydroxy-25-homochola-5,7-dienate 3-acetate (1)

Benzene (75 ml.) in a 500 ml. round bottom flask equipped with a stirrer, nitrogen inlet and a reflux condenser is concentrated at reflux to a volume of 67 ml. to dry the system. The benzene is cooled to just below reflux and 10 g. of methyl 3β-hydroxy-25-homochol-5-enate 3-acetate (VII), 67.5 ml. of petroleum ether dried over a molecular sieve, 50 mg. of benzoyl peroxide and 3.59 g. of 1,3-dibromo-5,5-dimethylhydantoin are added successively. The solution is stirred and refluxed for about 12 minutes until a negative starch iodide test is obtained. An additional 0.36 g. of the dibromohydantoin is added. The solution is refluxed for 5 minutes and is cooled to below room temperature. A precipitate of dimethylhydantoin is removed by filtration. The filtrate is concentrated and dried under reduced pressure to give a partly crystalline residue. The residue is taken up in 36 ml. of xylene (dried over a molecular sieve) and is added dropwise over 10 minutes to a refluxing solution of 45 ml. of xylene and 9 ml. of trimethylphosphite. The solution is refluxed for 1½ hours and is concentrated on a rotary evaporator to give a residue. The residue is dried under high vacuum for about 2 hours. The residue is triturated with 50 ml. of cold methanol to produce crystals. The crystals are filtered and washed with methanol to give 4.0 g. of crude I approximately 90% pure.

The above process is repeated several times and 15 g. of crude I so obtained is chromatographed through a column containing 750 g. of silica gel impregnated with silver nitrate, prepared from 1 kg. of silica gel and 1 kg. of silver nitrate in 2 l. of water at 90° and dried at 100° for 24 hours. The column is eluted by gradient elution between Skellysolve B hexanes and 30% ethyl acetate-Skellysolve B hexanes collecting 400 ml. fractions. The fractions containing the product are combined and recrystallized from methylene chloride-methanol to give 6.1 g. of methyl 3β-hydroxy-25-homochola-5,7-dienate 3-acetate (1), m.p. 133–137°, $$\lambda_{max.}^{alc} \ 282 \ m\mu \ (\epsilon = 12,000).$$

EXAMPLE 6

Chloesta-5,7-diene-3β,25-diol (IV)

A suspension of 20 ml. of 3M ethereal methyl magnesium bromide is added to a solution of 2.0 g. methyl 3β - hydroxy-25-homochola-5,7-dienate 3-acetate (I) in 100 ml. of dry ether and stirred at room temperature overnight. Ammonium chloride solution is added. The ether is separated and evaporated under a stream of $N_2$ to give a crystalline residue. The residue is collected on a filter, washed well with water, dried and recrystallized from methylene chloride-methanol to give cholesta-5,7-diene,3β,25-diol (IV) as a hydrate: yield 1.15 g., m.p. 185–187°, $\lambda_{max.}^{alc}$ 271 ($\epsilon = 9,850$), 281 ($\epsilon = 10,450$), 293 m$\mu$ ($\epsilon = 6,100$);

I.R. 3310, 3360 (OH), 1600, 1650 cm.$^{-1}$ (C = C); NMR (CDCl$_3$); δ 0.66 (C-18, H$_3$), 0.98 (C-19, H$_3$), 1.0 (d, C-21, H$_3$), 1.21 (C-25, C-26, H$_6$), 5.50 (q. j = 6 cps. C-6 and C-7-H$_2$).

Analysis.—Calcd. for $C_{27}H_{44}O_2 \cdot \frac{1}{2}H_2O$: C, 79.16; H, 11.07. Found: C, 79.08; H, 11.09.

If desired, the hydrate is dried to give anhydrous IV by warming at 60–80° under high vacuum or by dissolving in a solvent such as methylene chloride, drying with sodium sulfate, and removing the solvent by evaporation under anhydrous conditions.

In like manner, but substituting for methyl 3β-hydroxy-25-homochola-5,7-dienate-3-acetate (I) the following:

methyl 3β-hydroxy-25-homochola-5,7-dienate 3-propionate (I),
methyl 3β-hydroxy-25-homochola-5,7-dienate 3-isobutyrate (I),
methyl 3β-hydroxy-25-homochola-5,7-dienate 3-hexanoate (I),
methyl 3β-hydroxy-25-homochola-5,7-dienate 3-benzoate (I),
methyl 3β-hydroxy-25-homochola5,7-dienate 3-cyclohexylacetate (I),
ethyl 3β-hydroxy-25-homochola-5,7-dienate 3-acetate (I),
isopropyl 3β-hydroxy-25-homochola-5,7-dienate 3-acetate (I),
propyl 3β-hydroxy-25-homochola-5,7-dienate 3-butyrate (I),
n-butyl 3β-hydroxy-25-homochola-5,7-dienate 3-benzoate (I),
isooctyl 3β-hydroxy-25-homochola-5,7-dienate 3-hexanoate (I),
cyclohexyl 3β-hydroxy-25-homochola-5,7-dienate 3-aceate (I), and the like, there is produced cholesta-5,7-diene-3β,25-diol (IV).

13

In like manner, by substituting for methyl 3β-hydroxy-25-homochola-5,7-dienate 3-acetate (I), the following: methyl 3β - hydroxy - 25,26 - bishomochola-5,7-dienate 3-acetate (I) ethyl 3β-hydroxy-25,26-bishomochola-5,7-dienate 3-acetate (I), and methyl 3β-hydroxychola-5,7-dienate 3-acetate (I), there are produced: 24-homocholesta-5,7-diene-3β,25-diol (IV, $n=4$), 24 - homocholesta-5,7diene-3β,25-diol (IV, $n=4$), and 24-norcholesta-5,7-diene-3β,25-diol (IV, $n=2$), respectively.

EXAMPLE 7

9,10-Secocholesta-5(10),6-cis,8-triene-3β-25-diol (V) (25-hydroxyprecholecalciferol)

A solution of 125 mg. of cholesta-5,7-diene-3β,25-diol (IV) in 125 ml. of benzene and 10 ml. of absolute ethanol is placed in a photo reactor equipped with a quartz lampwell cooled with water and a nitrogen inlet. The reaction mixture is cooled to about 16° C., and purged with $N_2$. A Hanovia 8A36, 100 watt lamp, centered in the lampwell 2.5 cm. from the internal surface of the reaction mixture, is turned on for 15 minutes, including the 5–6 minutes required for the lamp to reach full brilliance. The lamp is a typical actinic anergy source suitable for the irradiation step in the known synthesis of Vitamin D, and can be replaced by any such available lamp. The specific lamp used is a 100-watt high-pressure quartz mercury-vapor lamp, producing approximately 11.5 watts total radiated energy distributed over the range of 220–1400 mμ. A fast stream of water is necessary to keep the outlet water temperature below 20° C. The reaction mixture is concentrated to dryness in a rotary evaporator below room temperature. The semisolid residue is triturated with 5 ml. of 35% ethyl acetate-65% Skellysolve B hexanes mixture and filtered and another 5 ml. of the same solvent is used for wash. The solid contains unreacted starting material and the liquor contains the product. The liquor is poured onto a 40 g. column containing TLC grade Florisil, 150–200 mesh packed wet with 35% ethyl acetate-Skellysolve B hexanes, and the products are eluted with the same solvent mixture collecting 10 ml. fractions. The fractions containing the product, located by spotting on a TLC plate, are combined and evaporated to dryness below room temperature to give an oily residue. A few drops of absolute ether are added and removed under vacuum to give 25-hydroxyprecholecalciferol (V) as a fluffy foam: yield 60 mg., $\lambda_{max}^{alc}$ 256 mμ ($\epsilon=8,300$), m.s. m/e 400 ($M^+$), 385, 382, 380, 376, 154, 136, 118;

NMR ($CDCl_3$), δ 0.71 (C-18-$CH_3$), 0.97 (d, C-21-$H_3$), 1.20 (C-25- and C-26-$H_6$), 1.63 (C-19-$H_3$), 3.90 (m, C-3-H), 5.54 (C-9-H), 5.54, 5.78, 5.89 and 6.10 (q, C-6 and C-7-$H_2$); GLC (6 ft. OV–17 column at 230°, injection port 240°) shows two peaks with retention times of 49 and 58 minutes characteristic of the "pyro" and "isopyro" transformation products.

EXAMPLE 8

25-Hydroxycholecalciferol hydrate (VI-hydrate)

A solution of about 300 mg. of 25-hydroxyprecholecalciferol (V) prepared as described in Example 7 in 5 ml. of chloroform is heated for 3½ hours at 70–75° under $N_2$ in a sealed flask. The solvent is evaporated and the residue is chromatographed through a 60 g. column containing TLC grade Florisil, 150–200 mesh packed wet with 35% ethyl acetate in Skellysolve B hexanes. The column is eluted with the same solvent mixture, collecting 10 ml. fractions. The fractions which crystallize on trituration with aqueous methanol are combined and recrystallized twice from aqueous methanol to give 25-hydroxycholecalciferol hydrate (VI-hydrate): yield 120 mg., m.p. 81–83° (sinters 75°), U.V. max. 264 mμ (a, 41.69). Mass spec.: same as reported by Blunt et al.

14

(Biochem. 7, 3317, 1968). NMR ($CDCl_3$), δ 0.55 (C-18-$H_3$), 0.96 (d, C-21-$H_3$), 1.0 (C-25 and C-26, $H_6$), 3.93 (m, C-3-H), 4.83 and 5.07 (C-19-$H_2$), 6.09 (d, J=11, C6 or 7-H), 6.23 (d, J=11 C6 or 7-H); GLC (6 ft. OV–17 column at 230, injection port 240°) shows two peaks with retention time of 49 and 58 minutes characteristic of the "pyro" and isopyro" transformation.

*Analysis.*—Calcd. for $C_{27}H_{44}O_2 \cdot H_2O$: C, 77.46; H, 11.08; $H_2O$, 4.32. Found: C,76.73; H, 11.31; $H_2O$, 4.95.

EXAMPLE 9

Methyl 3-β-hydroxy-9,10-seco-25-homochola-5(10),6-cis,8-trienate 3-acetate (II)

A solution of 0.25 g. of methyl 3β-hydroxy-25-homochola-5,7-dienate 3-acetate (I) in 125 ml. of benzene is irradiated as described in Example 7. The solvent is evaporated to give a residue. The residues from two such irradiations are combined and dissolved in 8% ethyl acetate in Skellysolve B hexanes and chromatographed through a 60 g. column containing TLC grade Florisil, 150–200 mesh using 8% ethyl acetate-Skellysolve B hexanes. Those fractions containing the product as determined by TLC are combined and evaporated to yield methyl 3β-hydroxy-9,10-sec-25-homochola-5(10),6-cis,8-trienate 3-acetate (II), as in oil: $\lambda_{max}$ 258 mμ ($\epsilon=11,800$); I.R. 1740 (C=O), 1435, 1375, 1360 (C—H), 1245, 1165, 1030 cm.$^{-1}$ (C—O); NMR ($CDCl_3$) δ 0.66 (s, C-18-$H_3$), 0.95 (d, C-21-$H_3$), 1.61 (s, C-19-$H_3$), 1.98 (s, $COCH_3$), 3.62 (s, $OCH_3$), 4.93 (m, C-3-H), 5.50 (s, C-9-H), 5.7 (d, J=about 11), 5.9 (d, J=about 11).

EXAMPLE 10

Methyl 3β-hydroxy-9,10-seco-25-homochola-5-cis, 7,10(19)-trienate 3-acetate (III)

A solution of 0.22 g. of methyl 3β-hydroxy-9,10-seco-25-homochola-5(10),6-cis,8-trienate 3-acetate (II) in 5 ml. of chloroform is heated at 70–75° C. for 3½ hours in a sealed tube. The solvent is evaporated to give a residue. The residue is dissolved in 8% ethyl acetate in Skellysolve B hexanes and chromatographed through a 60 g. column of TLC grade Florisil 150–200 mesh using 8% ethyl acetate in Skellysolve B hexanes, collecting 25 ml. fractions. Those fractions which contained product as measured by thin layer chromatography on silica gel plates impregnated with silver nitrate developed with 15% ethyl acetate-85% Skellysolve B hexanes were combined and evaporated, to give 90 mg. of methyl 3β-hydroxy-9,10-sec - 25 - homochola-5-cis-7,10(19)-trienate 3-acetate (III) as an oil:

$\lambda_{max}^{alc}$ 264 mμ ($\epsilon=14,450$);

I.R. 1740 (C=O), 1645, 1630 (C=C), 910, 890 cm.$^{-1}$ (=$CH_2$); NMR ($CHCl_3$), δ 0.52 (s, C-18-$H_3$), 0.93 (d, C-21-$H_3$), 2.00 (s, $CH_3CO$), 3.58 (s, $OCH_3$), 4.71 and 4.96 (d, =$CH_2$), 4.85 (m, C-3-H), 6.0 (d, J=11, C-6 or C-7, H), 6.2 (d, J=11, C-6 or C-6, H).

EXAMPLE 11

25-Hydroxycholecalciferol hydrate (VI-hydrate)

A solution of about 20 mg. of methyl 3β-hydroxy-9 (10)-seco-25-homochola-5-cis-7,10(19)-trienate 3-acetate (III) in 2 ml. of 3M ethereal methyl magnesium bromide is kept at room temperature overnight. Ammonium chloride solution is added and the ether layer is separated and combined with an ether extract of the aqueous layer. The combined ether solution is dried and evaporated to yield an oil. The oil is dissolved in 35% ethyl acetate-Skellysolve B hexanes and chromatographed through TLC grade Florisil as described in Example 8. Those fractions which crystallized on trituration with aqueous methanol are combined and recrystallized from aqueous methanol to give 4 mg. of 25-hydroxycholecalciferol hydrate (VI-hydrate) identical to the product described in Example 8.

In like manner, substituting octyl magnesium bromide, butyl magnesium bromide, isopropyl magnesium iodide, cyclopentyl magnesium bromide, phenyl magnesium bromide, and the like, for methyl magnesium bromide, there are produced the following:

26,27-bisnor-25,25-dioctyl-3β-hydroxycholestra-5-cis-7,10(19)-triene-3β,25-diol hydrate (VI-hydrate),
26,27-bisnor-25,25-dibutyl-3β-hydroxycholesta-5-cis,7,10(19)-triene-3β,25-diol hydrate (VI-hydrate),
26,27-bisnor-25,25-diisopropyl-3β-hydroxycholesta-5-cis,7,10(19)-triene-3β,25-diol hydrate (VI-hydrate),
26,27-bisnor-25,25-dicyclopentyl-3β-hydroxycholesta-5-cis,7,10(19)-triene-3β,25-diol hydrate (VI-hydrate),
26,27-bisnor-25,25-diphenyl-3β-hydroxycholesta-5-cis,7,10(19)-triene-3β-25-diol hydrate (VI hydrate)

and the like, respectively.

EXAMPLE 12

25-Hydroxycholecalciferol (VI)

A solution of 20 mg. of 25-hydroxycholecalciferol hydrate (VI-hydrate), prepared as described in Example 8, in 20 ml. of methylene chloride is dried with 200 mg. of anhydrous sodium sulfate. The solution is filtered and the filtrate is evaporated to yield 25-hydroxycholecalciferol (VI) essentially anhydrous as an amorphous oil.

EXAMPLE 13

25-Hydroxycholecalciferol (VI)

A solution of 116 mg. of 25-hydroxycholecalciferol hydrate (VI-hydrate), prepared as described in Example 8, in 15 ml. of benzene is refluxed at atmospheric pressure for 3 minutes then concentrated under reduced pressure to yield 25-hydroxycholecalciferol (VI) essentially anhydrous as an amorphous oil.

EXAMPLE 14

25-Hydroxycholecalciferol (VI)

A round bottom flask containing 80 mg. of crystalline 25-hydroxycholecalciferol hydrate (VI-hydrate) is heated to 80° under high vacuum (0.1–2 mm. Hg) for 3 hours to yield 25-hydroxycholecalciferol (VI) essentially anhydrous as an amorphous oil: wt. loss 4.02% (calcd. 4.31%).

Analysis.—Calcd. for $C_{27}H_{44}O_2$: C, 80.94; H, 11.07. Found: C, 80.15; H, 10.92.

EXAMPLE 15

25-Hydroxycholecalciferol hydrate (VI-hydrate)

25-Hydroxycholecalciferol (VI) prepared as described in Examples 12–14 is dissolved in warm methylene chloride to afford a concentration of 10 mg./ml. The solvent is allowed to evaporate slowly and the concentrated solution is scratched in an attempt to produce crystals. No crystals are obtained at any concentration, only oily VI being recovered. A drop of water is added to the methylene chloride solution of VI and crystals of 25-hydroxycholecalciferol hydrate (VI-hydrate) are obtained, m.p. 81–83°.

In like manner, a solution of 25-hydroxycholecalciferol (VI) in benzene does not yield crystals. A drop of water is added to a concentrated solution of 25-hydroxycholecalciferol (VI) in benzene to afford nice crystals of 25-hydroxycholecalciferol hydrate (VI-hydrate). Substituting ether for benzene also affords crystalline 25-hydroxycholecalciferol hydrate (VI-hydrate).

In like manner, 25-hydroxycholecalciferol (VI) does not crystallize from anhydrous methanol, anhydrous ethanol, or anhydrous acetone. A drop of water is added to these concentrated solutions to afford crystals of 25-hydroxycholecalciferol hydrate (VI-hydrate).

EXAMPLE 16

25-Hydroxycholecalciferol 3-acetate (VI)

25-Hydroxycholecalciferol (100 mg.) is dissolved in 0.5 cc. of pyridine and 0.2 cc. of acetic anhydride and allowed to stand for 15 hours at about 25°. The solution is diluted with water and extracted with methylene chloride. The methylene chloride layer is washed with dilute hydrochloric acid, dilute sodium bicarbonate and water, is dried over anhydrous sodium sulfate, and is concentrated at reduced pressure to yield a residue. The residue is chromatographed as described in Example 8. Those fractions which contain the product as determined by thin layer chromatography are combined and concentrated to afford a residue of 25-hydroxycholecalciferol 3-acetate (VI).

Following the above procedure but substituting acetyl chloride for acetic anhydride and conducting the esterification in an inert solvent, namely, 5 ml. of methylene chloride, there is produced 25-hydroxycholecalciferol 3-acetate (VI).

In like manner, but substituting for acetic anhydride or acetyl chloride the following esterifying reagents: propionic anhydride, isobutyric anhydride, hexanoic anhydride, cyclopentyl propionic acid chloride, decanoic acid chloride, cyclohexanecarboxylic acid chloride, benzoyl chloride, and the like, there are produced 25-hydroxycholecalciferol 3-propionate (VI), 25-hydroxycholecalciferol 3 - isobutyrate (VI), 25-hydroxycholecalciferol 3-hexanoate (VI), 25-hydroxycholecalciferol 3-cyclopentylpropionate (VI), 25-hydroxycholecalciferol 3-decanoate (VI), 25-hydroxycholecalciferol 3-cyclohexanecarboxylate (VI), 25-hydroxycholecalciferol 3-benzoate (VI), and the like.

In like manner, substituting 25-hydroxycholecalciferol hydrate (VI-hydrate) for 25-hydroxycholecalciferol (VI), there is produced the corresponding 3-acylate of 25-hydroxycholecalciferol (VI).

EXAMPLE 17

Cholesta-5,7-diene-3β,25-diol 3-acetate (IV)

Following the procedure of Example 16 but substituting cholesta - 5,7-diene-3β,25-diol (IV), 25-homocholesta-5,7-diene-3β,25-diol (IV) and 24-norcholesta-5,7-diene-3β,25-diol (IV), for 25-hydroxycholecalciferol (VI), there is produced cholesta-5,7-diene-3β,25-diol 3-acetate (IV), 24-homocholesta-5,7-diene-3β,25-diol 3-acetate (IV) and 24-norcholesta-5,7-diene-3β,25-diol 3 - acetate (IV), respectively.

In like manner, but substituting for acetic anhydride the following: propionic anhydride, isobutyric anhydride, hexanoic anhydride, benzoic anhydride, cyclohexylacetic anhydride, and the like, there are produced: cholesta-5,7-diene-3β,25-diol 3 - propionate (IV), cholesta-5,7-diene-3β,25 - diol 3-isobutyrate (IV), cholesta-5,7-diene-3β,25-diol 3-hexanoate (IV), cholesta-5,7-diene-3β,25-diol 3-benzoate (IV), cholesta-5,7-diene-3β,25-diol 3-cyclohexylacetate (IV), and the like.

In like manner, but substituting 24-homocholesta-5,7-diene-3β,25-diol (IV) and 24-norcholesta-5,7-diene-3β,25-diol (IV) for cholesta-5,7-diene-3β,25-diol (IV) there are produced 24-homocholesta-5,7-diene-3β,25-diol 3-acetate (IV) and 24-norcholesta-5,7-diene-3β,25-diol 3-acetate (IV), respectively.

EXAMPLE 18

Cholesta-5,7-diene-3β,25-diol 3β,25-diacetate (IV)

A solution of 500 mg. of cholesa-5,7-diene-3β,25-diol (IV) in 5 ml. of pyridine and 5 ml. of acetic anhydride is heated at 100° under nitrogen for 3 hours when TLC analysis indicates the acetylation to be essentially complete. The solution is cooled, diluted with water, extracted, and concentrated as described in Example 15 to afford a residue. The residue is chromatographed as described in Example 8. Those fractions which are essentially pure cholesta-5,7-diene-3β,25-diol diacetate are combined and evaporated to give a residue of cholesta-5,7-diene-3β,25-diol diacetate.

In like manner, but substituting for acetic anhydride the following: propionic anhydride, isobutyric anhydride, hexanoic anhydride, benzoic anhydride, cyclohexylacetic anhydride, and the like, there are produced: cholesta-5,7-diene-3β,25-diol dipropionate (IV), cholesta-5,7-diene-3β,25-diol diisobutyrate (IV), cholesta-5,7-diene-3β,25-diol dihexanoate (IV), cholesta-5,7-diene-3β,25-diol dibenzoate (IV), cholesta-5,7-diene-3β,25-diol dicyclohexylacetate (IV) and the like.

In like manner, but substituting 24-homocholesta-5,7-diene-3β,25-diol (IV) and 24-norcholesta-5,7-diene-3β,25-diol (IV) for cholesta-5,7-diene-3β,25-diol (IV), there are produced 24-homocholesta-5,7-diene-3β,25-diol diacetate (IV) and 24-norcholesta-5,7-diene-3β,25-diol diacetate (IV), respectively.

EXAMPLE 19

Cholesta-5,7-diene-3β,25-diol 25-acetate (IV)

A solution of 20 mg. of cholesta-5,7-diene-3β,25-diol diacetate in 1 cc. of methanol containing 0.2 cc. of water and 20 mg. of sodium bicarbonate is allowed to stand for 16 hours at about 25° under a nitrogen atmosphere. The solution is diluted with 10 cc. of water and extracted with methylene chloride. The methylene chloride solution is washed, dried, and evaporated to give a residue of cholesta-5,7-diene-3β,25-diol 25-acetate. Purification may be accomplished if needed by chromatography as described in Example 4.

In like manner, but substituting for cholesta-5,7-diene-3β,25-diol diacetate the following: cholesta-5,7-diene-3β,25-diol dipropionate (IV), cholesta-5,7-diene-3β,25-diol diisobutyrate (IV), cholesta-5,7-diene-3β,25-diol dihexanoate (IV), cholesta-5,7-diene-3β,25-diol dibenzoate (IV), cholesta-5,7-diene-3β,25-diol dicyclohexylacetate (IV), 24-homocholesta-5,7-diene-3β,25-diol diacetate (IV), 24-norcholesta-5,7-diene-3β,25-diol diacetate (IV), and the like, there are produced cholesta-5,7-diene-3β,25-diol 25-propionate (IV), cholesta-5,7-diene-3β,25-diol 25-isobutyrate (IV), cholesta-5,7-diene-3β,25-diol 25-hexanoate (IV), cholesta-5,7-diene-2β,25-diol 25-benzoate (IV), 24-homocholesta-5,7-diene-3β,25-diol 25-acetate (IV) and 24-norcholesta-5,7-diene-3β,25-diol 25-acetate (IV), respectively.

EXAMPLE 20

24-Nor-9,10-secocholesta-5(10),6-cis,8-triene-3β,25-diol (V)

Following the procedure of Example 7 but substituting 24-norcholesta-5,7-diene-3β,25-diol (IV) for cholesta-5,7-diene-3β,25-diol (IV), there is produced 24-nor-9,10-secocholesta-5(10),6-cis,8-triene-3β,25-diol (V).

EXAMPLE 21

24-Homo-9,10-secocholesta-5(10),6-cis,8-triene-3β,25-diol (V)

Following the procedure of Example 7 but substituting 24-homocholesta-5,7-diene-3β,25-diol (IV) for cholesta-5,7-diene-3β,25-diol (IV), there is produced 24-homo-9,10-secocholesta-5(10),6-cis,8-triene-3β,25-diol (V).

EXAMPLE 22

9,10-Secocholesta-5(10),6-cis,8-triene-3β,25-diol diacetate (V)

Following the procedure of Example 7 but substituting cholesta-5,7-diene-3β,25-diol diacetate (IV), for cholesta-5,7-diene-3β,25-diol (IV) there is produced 9,10-secocholesta-5(10),6-cis,8-triene-3β,25-diol diacetate (V).

In like manner, but substituting for cholesta-5,7-diene-3β,25-diol diacetate (IV) the following:

cholesta-5,7-diene-3β,25-diol dipropionate (IV),
cholesta-5,7-diene-3β,25-diol diisobutyrate (IV),
cholesta-5,7-diene-3β,25-diol dihexanoate (IV),
cholesta-5,7-diene-3β,25-diol dibenzoate (IV),
cholesta-5,7-diene-3β,25-diol dicyclohexylacetate (IV),
24-homocholesta-5,7-diene-3β,25-diol diacetate (IV),
24-norcholesta-5,7-diene-3β,25-diol diacetate (IV),
cholesta-5,7-diene-3β,25-diol 25-acetate (IV),
cholesta-5,7-diene-3β,25-diol 25-propionate (IV),
cholesta-5,7-diene-3β,25-diol 25-isobutyrate (IV),
cholesta-5,7-diene-3β,25-diol 25-hexanoate (IV),
cholesta-5,7-diene-3β,25-diol 25-benzoate (IV),
cholesta-5,7-diene-3β,25-diol 25-cyclohexylacetate (IV),
24-homocholesta-5,7-diene-3β,25-diol 25-acetate (IV),
24-norcholesta-5,7-diene-3β,25-diol 25-acetate (IV),
cholesta-5,7-diene-3β,25-diol 3-acetate (IV),
cholesta-5,7-diene-3β,25-diol 3-propionate (IV),
cholesta-5,7-diene-3β,25-diol 3-isobutyrate (IV),
cholesta-5,7-diene-3β,25-diol 3-hexanoate (IV),
cholesta-5,7-diene-3β,25-diol 3-benzoate (IV),
cholesta-5,7-diene-3β,25-diol 3-cyclohexylacetate (IV),
24-homocholesta-5,7-diene-3β,25-diol 3-acetate (IV),
24-norcholesta-5,7-diene-3β,25-diol 3-acetate (IV), and the like, there are produced:

9,10-secocholesta-5(10),6-cis,8-triene-3β,25-diol dipropionate (V),
9,10-secocholesta-5(10),6-cis,8-triene-3β,25-diol diisobutyrate (V),
9,10-secocholesta-5(10),6-cis,8-triene-3β,25-diol dihexanoate (V),
9,10-secocholesta-5(10),6-cis,8-triene-3β,25-diol dibenzoate (V),
9,10-secocholesta-5(10),6-cis,8-triene-3β,25-diol dicyclohexylacetate (V),
9,10-seco-24-homocholesta-5(10),6-cis,8-triene-3β,25-diol diacetate (V)
9,10-seco-24-norcholesta-5(10),6-cis,8-triene-3β,25-diol diacetate (V),
9,10-secocholesta-5(10),6-cis,8-triene-3β,25-diol 25-propionate (V),
9,10-secocholesta-5(10),6-cis,8-triene-3β,25-diol 25-isobutyrate (V),
9,10-secocholesta-5(10),6-cis,8-triene-3β,25-diol 25-hexanoate (V),
9,10-secocholesta-5(10),6-cis,8-triene-3β,25-diol 25-benzoate (V),
9,10-secocholesta-5(10),6-cis,8-triene-3β,25-diol 25-cyclohexylacetate (V),
9,10-seco-24-homocholesta-5(10),6-cis,8-triene-3β,25-diol 25-acetate (V),
9,10-seco-24-norcholesta-5(10),6-cis,8-triene-3β,25-diol 25-acetate (V),
9,10-secocholesta-5(10),6-cis,8-triene-3β,25-diol 3-propionate (V),
9,10-secocholesta-5(10),6-cis,8-triene-3β,25-diol 3-isobutyrate (V),
9,10-secocholesta-5(10),6-cis,8-triene-3β,25-diol 3-hexanoate (V),
9,10-secocholesta-5(10),6-cis,8-triene-3β,25-diol 3-benzoate (V),
9,10-secocholesta-5(10),6-cis,8-triene-3β,25-diol 3-cyclohexylacetate (V),
9,10-seco-24-homocholesta-5(10),6-cis,8-triene-3β,-25-diol 3-acetate (V), and
9,10-seco-24-norcholesta-5(10),6-cis,8-triene-3β,25-diol 3-acetate (V), respectively.

EXAMPLE 23

9,10-Seco-24-norcholesta-5-*cis*,7,10(19)-triene-3β,25-diol hydrate (VI-hydrate)

Following the procedure of Example 8 but substituting 9,10-seco-24-norcholesta-5(10),6-*cis*,8-triene - 3β,25 - diol (V) for 9,10-secocholesta-5(10),6-*cis*,8-triene-3β,25-diol (V), there is produced 9,10-seco-24-norcholesta-5-*cis*,7,10(19)-triene-3β,25-diol hydrate (VI-hydrate).

EXAMPLE 24

9,10-Seco-24-homocholesta-5-*cis*,7,10(19)-triene-3β,25-diol hydrate (VI-hydrate)

Following the procedure of Example 8 but substituting 9,10-seco-24-homocholesta-5(10),6-*cis*,8 - triene - 3β,25-diol (V) for 9,10-secocholesta-5(10),6-*cis*,8-triene-3β,25-diol (V), there is produced 9,10-seco-24-homocholesta-5-*cis*,7,10(19)-triene-3β,25-diol hydrate (VI-hydrate).

EXAMPLE 25

9,10-Secocholesta-5-*cis*,7,10(19)-triene-3β,25-diol diacetate (VI)

Following the procedure of Example 8 but substituting 9,10-secocholesta-5(10),6-*cis*,8-triene,3β,25 - diol diacetate (V) for 9,10-secocholesta-5(10),6-*cis*,8-triene-3β,25-diol (V) there is produced 9,10-secocholesta-5-*cis*,7,10(19)-triene-3β,25-diol diacetate (VI).

In like manner, but substituting for 9,10-secocholesta-5(10),6-*cis*,8-triene-3β,25-diol diacetate (V), the following:

9,10-secocholesta-5(10),6-*cis*,8-triene-3β,25-diol dipropionate (V),
9,10-secocholesta-5(10),6-*cis*,8-triene-3β,25-diol diisobutyrate (V),
9,10-secocholesta-5(10),6-*cis*,8-triene-3β,25-diol dihexanoate (V),
9,10-secocholesta-5(10),6-*cis*,8-triene-3β,25-diol dibenzoate (V),
9,10-secocholesta-5(10),6-*cis*,8-triene-3β,25-diol dicyclohexylacetate (V),
9,10-seco-24-homocholesta-5(10),6-*cis*,8-triene-3β,25-diol diacetate (V),
9,10-seco-24-norcholesta-5(10),6-*cis*,8-triene-3β,25 diol diacetate (V),
9,10-secocholesta-5(10),6-*cis*,8-triene-3β,25-diol 25-propionate (V),
9,10-secocholesta-5(10),6-*cis*,8-triene-3β,25-diol 25-isobutyrate (V),
9,10-secocholesta-5(10),6-*cis*,8-triene-3β,25-diol 25-hexanoate (V),
9,10-secocholesta-5(10),6-*cis*,8-triene-3β,25-diol 25-benzoate (V),
9,10-secocholesta-5(10),6-*cis*,8-triene-3β,25-diol 25-cyclohexylacetate (V),
9,10-seco-24-homocholesta-5(10),6-*cis*,8-triene-3β,25-diol 25-acetate (V),
9,10-seco-24-norcholesta-5(10),6-*cis*,8-triene-3β,25-diol 25-acetate (V),
9,10-secocholesta-5(10),6-*cis*,8-triene-3β,25-diol 3-propionate (V),
9,10-secocholesta-5(10),6-*cis*,8-triene-3β,25-diol 3-isobutyrate (V),
9,10-secocholesta-5(10),6-*cis*,8-triene-3β,25-diol 3-hexanoate (V),
9,10-secocholesta-5(10),6-*cis*,8-triene-3β,25-diol 3-benzoate (V),
9,10-secocholesta-5(10),6-*cis*,8-triene-3β,25-diol 3-cyclohexylacetate (V),
9,10-seco-24-homocholesta-5(10),6-cis,8-triene-3β,25-diol 3-acetate (V),
and
9,10-seco-24-norcholesta-5(10),6-*cis*,8-triene-3β,25-diol 3-acetate (V), and the like, there is produced:

9,10-secocholesta-5-*cis*,7,10(19)-triene-3β,25-diol dipropionate (VI),
9,10-secocholesta-5-*cis*,7,10(19)-triene-3β,25-diol diisobutyrate (VI),
9,10-secocholesta-5-*cis*,7,10(19)-triene-3β,25-diol dihexanoate (VI),
9,10-secocholesta-5-*cis*,7,10(19)-triene-3β,25-diol dibenzoate (VI),
9,10-secocholesta-5-*cis*,7,10(19)-triene-3β,25-diol dicyclohexylacetate (VI),
9,10-seco-24-homocholesta-5-*cis*,7,10(19)-triene-3β,25-diol diacetate (VI),
9,10-seco-24-norcholesta-5-*cis*,7,10(19)-triene-3β,25-diol diacetate (VI),
9,10-secocholesta-5-*cis*,7,10(19)-triene-3β,25-diol 25-propionate (VI),
9,10-secocholesta-5-*cis*,7,10(19)-triene-3β, 25-diol 25-isobutyrate (VI),
9,10-secocholesta-5-*cis*,7,10(19)-triene-3β,25-diol 25-hexanoate (VI),
9,10-secocholesta-5-*cis*,7,10(19)-triene-3β,25-diol benzoate (VI),
9,10-secocholesta-5-*cis*,7,10(19)-triene-3β,25-diol 25-cyclohexylacetate (VI),
9,10-seco-24-homocholesta-5-*cis*,7,10(19)-triene-3β,25-diol 25-acetate (VI),
9,10-seco-24-norcholesta-5-*cis*,7,10(19)-triene-3β,25-diol 25-acetate (VI),
9,10-secocholesta-5-*cis*,7,10(19)-triene-3β,25-diol 3-propionate (VI),
9,10-secocholesta-5-*cis*,7,10(19)-triene-3β,25-diol 3-isobutyrate (VI),
9,10-secocholesta-5-*cis*,7,10(19)-triene-3β,25-diol 3-hexanoate (VI),
9,10-secocholesta-5-*cis*,7,10(19)-triene-3β,25-diol 3-benzoate (VI),
9,10-secocholesta-5-*cis*,7,10(19)-triene-3β,25-diol 3-cyclohexylacetate (VI),
9,10-seco-24-homocholesta-5-*cis*,7,10,(19)-triene-3β,25-diol 3-acetate (VI),
and
9,10-seco-24-norcholesta-5-*cis*,7,10(19)-triene-3β,25-diol 3-acetate (VI), respectively.

EXAMPLE 26

9,10-Secocholesta-5(10),6-*cis*-8,24-tetraen-3β-ol

Following the procedure of Example 7 but substituting cholesta - 5,7,24 - trien-3β-ol and acylates thereof for cholesta-5,7-diene-3β,25-diol (IV), there is produced 9,10-secocholesta-5(10),6-*cis*,8,24-tetraen - 3β - ol, and acylates thereof.

Alternatively, acylation of 9,10-secocholesta-5(10),6-*cis*,8,24-tetraen-3β-ol, according to the procedure of Example 16, for example, with acetic anhydride, produces the corresponding 3-acylate, for example 9,10-secocholesta-5(10),6-*cis*,8,24-tetraen-3β-ol acetate.

EXAMPLE 27

9,10-secocholesta-5-*cis*,7,10(19),24-tetraen-3β-ol (24-dehydrocholecalciferol)

Following the procedure of Example 8 but substituting 9,10-secocholesta-5(10),6-*cis*,8,24-tetraen-3β-ol and the 3-acylates (e.g., acetate) thereof for 9,10-secocolesta-5(10),6-*cis*,8-triene-3β,25-diol (V), there are produced 9,10-secocholesta-5-*cis*,7,10(19),24-tetraen-3β-ol (24-dehydrocholecalciferol) and the 3-acylates (e.g., acetate) thereof. The thus produced 24-dehydrocholecalciferol and acylates thereof exhibit potent calcium mobilizing effects and induce increased intestinal calcium absorption in birds, man and other mammals. They may be used in place of 25- hydroxycholecalciferol (VI) in the unit dosage forms and for the purposes described above.

EXAMPLE 28

9,10-Secocholesta-5-trans,7-trans-diene-3β,25-diol

25-Hydroxycholecalciferol (VI), 100 mg. is dissolved in 10 ml. of absolute ether and added to 50 ml. of liquid ammonia. About 100 mg. of lithium is added in small pieces with stirring until the solution remains blue for 10 minutes. The ammonia is allowed to evaporate, water is added, and the product is extracted with ether. The ether is washed, dried and evaporated to give a residue which is further dried under high vacuum. The residue is dissolved in ethyl acetate-Skellysolve B and chromatographed as described in Example 8. Those fractions with ultraviolet absorption near 251 mµ and which appear to be essentially pure by TLC are combined and evaporated to afford 9,10 - secocholesta - 5 - trans,7-trans-diene - 3β,25 - diol (25 - hydroxydihydrotachysterol₃). 9,10 - Secocholesta-5-trans,7-trans-diene - 3β,25 - diol is a potent agent in effecting calcium absorption in birds, man and other mammals and may be substituted for 25-hydroxycholecalciferol in the unit dosage forms and for the purposes described above.

EXAMPLE 29

25-Hydroxycholecalciferol (VI)

In the process of Example 7, the temperature is allowed to rise during irradiation to near the reflux temperature of the solvent instead of maintaining the temperature below 20°. The thus produced irradiation product is purified by chromatography as described in Example 7 to afford directly 25-hydroxycholecalciferol (VI).

In like manner, other compounds of structures I and IV are irradiated at elevated temperatures to afford directly the corresponding products of structures III and VI, respectively.

EXAMPLE 30

25-Hydroxycholecalciferol hydrate (VI-hydrate)

A solution of 200 mg. of 9,10-secocholesta-5-(10),6-cis,8-triene-3β,25-diol (V) in 5 ml. of ethanol and 0.5 cc. of water is refluxed gently under nitrogen for several hours and concentrated until, on cooling to room temperature, the solution is just turbid. A seed of crystalline 25-hydroxycholecalciferol hydrate (VI-hydrate) is added and the seeded solution allowed to stand for several hours while crystals separate. The crystals are removed by filtration and are washed with aqueous ethanol to yield 25-hydroxycholecalciferol hydrate (VI-hydrate). In like manner, other compounds of structure V are isomerized in an aqueous solvent to yield directly the hydrates of compounds of structure VI.

EXAMPLE 31

27-Nor-3β-hydroxycholest-5-en-25-one 3-acetate (VIIa)

Following the procedure of Riegel and Kaye, J. Am. Chem. Soc. 66, 723 (1944), but substituting 3β-hydroxy-25-homochol - 5 - enic acid chloride 3-acetate (VII') for 3β - hydroxychol - 5 - enic acid chloride 3-acetate (VII') and dimethyl cadmium for diisopropyl cadmium, there is produced 27-nor-3β-hydroxycholest-5-en-25-one 3-acetate (VIIa).

In like manner, but substituting dioctyl cadmium, dibutyl cadmium, diisopropyl cadmium, dicyclopentyl cadmium, and diphenyl cadmium for dimethyl cadmium, there are the like, there are produced: 26,27 - bisnor - 25 - octyl-3β-hydroxycholest - 5 - en-25-one 3-acetate (VIIa), 26,27-bisnor - 25 - butyl - 3β - hydroxycholest - 5 - en-25-one 3-acetate (VIIa), 26,27-bisnor - 25 - isopropyl-3β-hydroxycholest-5-en-25-one 3-acetate (VIIa), 26,27-bisnor-25-cyclopentyl - 3β - hydroxycholest - 5 - en-25-one 3-acetate (VIIa), 26,27-bisnor - 25 - phenyl - 3β - hydroxycholest-5-en-25-one 3-acetate (VIIa), and the like respectively.

EXAMPLE 32

27-Nor-25-phenylcholest-5-ene-3β,25-diol (VIIb)

Following the procedure of Example 6 but substituting 27-nor-3β-hydroxycholest - 5 - en-25-one 3-acetate (VIIa) for methyl 3β-hydroxy - 25 - homochola - 5,7 - dienate 3-acetate (I) and phenyl magnesium bromide for methyl magnesium bromide there is produced 27-nor-25-phenylcholest-5-ene-3β,25-diol (VIIb).

In like manner, substituting octyl magnesium bromide, butyl magnesium bromide, isopropyl magnesium bromide, cyclopentyl magnesium bromide, and the like, for phenyl magnesium bromide there are produced: 27-nor-25-octylcholest - 5 - ene - 3β,25 - diol (VIIb), 27-nor-25-butylcholest - 5 - ene - 3β,25 - diol (VIIb), 27-nor-25-isopropylcholest-5-ene-3β25-diol (VIIb),27-nor - 25 - cyclopentylcholest-5-ene-3β,25-diol (VIIb), and the like, respectively.

Similarly, 26,27 - bisnor - 25 - phenyl - 3β - hydroxycholest-5-en-25-one 3-acetate (VIIa) and the above alkyl magnesium halides produce, according to the procedure of Example 6, the following: 26,27-bisnor - 25 - octyl-25-phenylcholest - 5 - ene - 3β,25 - diol ((VIIb), 26,27-bisnor-25-butyl - 25 - phenylcholest - 5 - ene-3β,25-diol (VIIb), 26,27-bisnor - 25 - isopropyl - 25 - phenylcholest-5-ene-3β,25-diol (VIIb), 26,27-bisnor - 25 - cyclopentyl-25-phenylcholest-5-ene-3β,25-diol (VIIb), and the like, respectively.

EXAMPLE 33

27-Norcholest-5-ene-3β,25-diol (VIIb)

A solution of 27-nor-3β-hydroxycholest-5-en-25-one 3-acetate (VIIa) (200 mg.) in 10 ml. of tetrahydrofuran is refluxed with about 150 mg. of lithium aluminum hydride. Aqueous ammonium chloride is added and the ether layer is separated and washed. Evaporation of the ether layer affords a residue of 27-norcholest-5-ene-3β,25-diol (VII) which can be purified if desired by chromatography and crystallization. In like manner, other compounds of structures VIIa and Ia can be reduced to afford compounds of structure VIIb and Ib, respectively.

EXAMPLE 34

27-Nor-25-phenylcholesta-5,7-diene-3β,25-diol (IV)

27-Nor - 25 - phenylcholest-5-ene - 3β,25 - diol (VIIb) or its acetate is substituted for methyl 3β-hydroxy-25-homochol - 5 - enate 3-acetate (VII) in the process of Example 4. There is produced 27-nor - 25 - phenylcholesta-5,7-diene-3β,25-diol (IV). In like manner, cholest-5-ene-3β,25-diol (VIIb) affords cholesta-5,7-diene - 3β,25 - diol (IV) and other substances of structures VIIb and VII afford the corresponding substances of structure IV and I, respectively.

What is claimed is:

1. A compound having the formula:

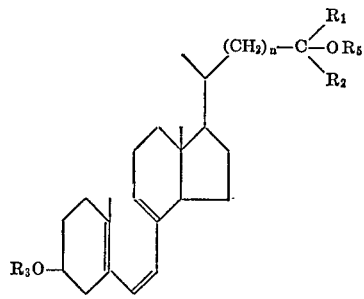

wherein $R_1$ and $R_2$ are selected from the group consisting of H, alkyl of less than 9 carbons, and phenyl, $R_3$ and $R_5$ are selected from the group consisting of hydrogen and an acyl radical of a hydrocarbon carboxylic acid of less than 12 carbons, and $n$ is selected from the integers 2, 3 and 4, inclusive.

2. A compound in accordance with Claim 1, 9,10-secocholesta-5(10),6-cis,8-triene-3β,25-diol.

3. A compound having the formula:

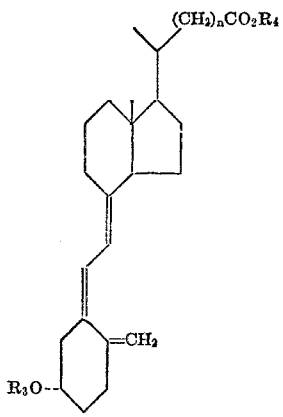

wherein $R_3$ is selected from the group consisting of hydrogen and an acyl radical of a hydrocarbon carboxylic acid of less than 12 carbon atoms, $R_4$ is selected from the group consisting of H and lower alkyl of less than 9 carbon atoms, and $n$ is selected from the integers 3 and 4, inclusive.

4. A compound in accordance with Claim 3, methyl $3\beta$ - hydroxy - 9,10-seco-25-homochola-5-cis,7,10(19)-trienate 3-acetate.

5. A compound having the formula:

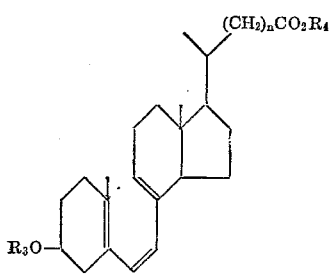

wherein $R_3$ is selected from the group consisting of hydrogen and an acyl radical of a hydrocarbon carboxylic acid of less than 12 carbon atoms, $R_4$ is selected from the group consisting of H and lower alkyl of less than 9 carbons, and $n$ is selected from the integers 3 and 4, inclusive.

6. A compound according to Claim 5, methyl $3\beta$-hydroxy - 9,10-seco-25-homochola-5(10),6-cis,8-trienate 3-acetate.

7. A process for the production of crystalline 25-hydroxycholecalciferol hydrate, which comprises adding water to anhydrous 25-hydroxycholecalciferol and recovering the crystalline hydrate.

8. A process for the production of product compounds having the formula:

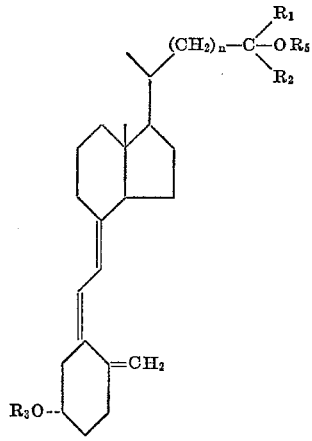

which comprises heating a starting compound of the formula:

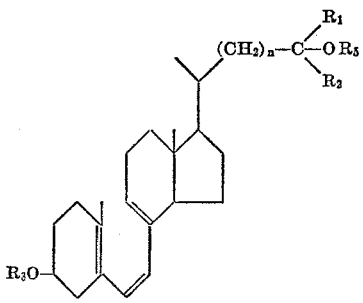

wherein $R_1$ and $R_2$ are selected from the group consisting of hydrogen, lower alkyl of less than 9 carbons, and phenyl, $R_3$ and $R_5$ are selected from the group consisting of hydrogen and acyl where acyl is a hydrocarbon carboxylic acid of less than 12 carbons, $n$ is selected from the integers 2, 3 and 4, inclusive in an inert reaction medium to produce a mixture enriched in the product compound and separating the product therefrom.

9. The method of Claim 8 wherein $R_3$ and $R_5$ are hydrogen and wherein the reaction medium comprises water, and the product is recovered as a hydrate.

10. A process for the production of compounds having the formula:

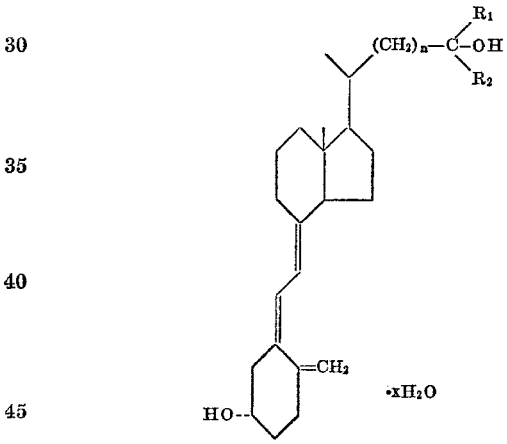

which comprises treating in an inert reaction medium a compound having the formula:

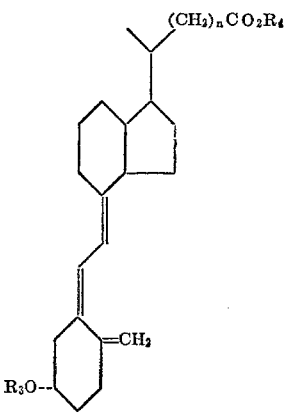

wherein $R_1$ and $R_2$ are selected from the group consisting of hydrogen, lower alkyl of less than 9 carbons, and phenyl, $R_3$ is selected from the group consisting of hydrogen and acyl where acyl is a hydrocarbon carboxylic acid of less than 12 carbons, $R_4$ is selected from the group consisting of hydrogen and lower alkyl, $n$ is selected from the integers 2, 3 and 4, inclusive, and $x$ is a whole or simple fractional number from 0-2, inclusive, with a reagent selected from the group consisting of an alkyl and phenyl magnesium halide and an alkyl lithium and isolating the product therefrom.

11. The process of Claim 10 wherein water is adding during isolation of the product, and the product is recovered as the hydrate.

12. A process for the production of product compounds having the formula:

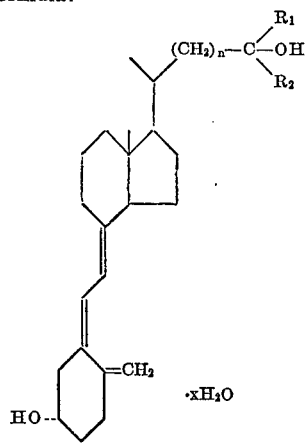

which comprises treating a starting compound having the formula:

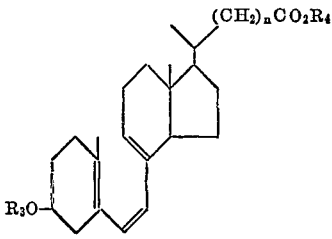

wherein $R_1$ and $R_2$ are selected from the group consisting of hydrogen, lower alkyl of less than 9 carbons, and phenyl, $R_3$ is selected from the group consisting of hydrogen and acyl where acyl is a hydrocarbon carboxylic acid of less than 12 carbons, $R_4$ is selected from the group consisting of hydrogen and lower alkyl, $n$ is selected from the integers, 2, 3 and 4, inclusive, and $x$ is a whole or simple fractional number from 0–2, inclusive, with a reagent selected from the group consisting of an alkyl and phenyl magnesium halide and an alkyl lithium, heating the thus-produced material and separating the product compound therefrom.

13. The new chemical compound, crystalline 25-hydroxycholecalciferol hydrate having a U.V. max. 264 m$\mu$ (a, 41.69) and an NMR (CDCl$_3$), $\delta$ 0.55 (C-18-H$_3$), 0.96 (d, C-21-H$_3$), 1.0 (C-25 and C-26, H$_6$), 3.93 (m, C-3-H), 4.83 and 5.07 (C-19-H$_2$), 6.09 (d, J=11, C$_6$ or 7-H), 6.23 (d, J=11, C6 or 7-H) and having a melting point of about 81–83° C.

References Cited

UNITED STATES PATENTS 3,565,924   2/1971   De Luca et al. ____ 260—397.2

OTHER REFERENCES

Proceedings of the National Academy of Sciences, vol. 61, No. 4 (1968) by Blunt et al.

ELBERT L. ROBERTS, Primary Examiner

U.S. Cl. X.R.

260—397.1; 424—236

UNITED STATES PATENT OFFICE
CERTIFICATE OF CORRECTION

Patent No. 3,833,622                    Dated September 3, 1974

Inventor(s) John C. Babcock and J Allan Campbell

It is certified that error appears in the above-identified patent and that said Letters Patent are hereby corrected as shown below:

Column 1, lines 41-43, for " 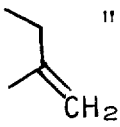 " should read -- 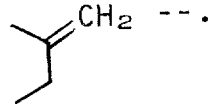 --.

Column 2, lines 48-50, for "  " should read -- 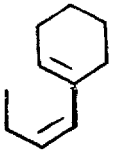 --.

Column 5, line 9, for "IV" should read -- Ib --. Column 5, line 21, for "R₃ is H. This" should read -- R₃ is lower acyl and by 33.3% from that required when R₃ is H. This --. Column 5, line 63, for "inhydride" should read -- anhydride --. Column 6, line 31, for "(₄" should read -- (R₄ --. Column 9, line 13, for "(VIII')," should read -- (VII'), --. Column 11, line 7, for "bischomochol" should read -- bishomochol --. Column 12, line 33, for "diene,3β,25-" should read -- diene-3β,25- --. Column 12, line 40, for "(q. j=6" should read -- (q, J=6 --. Column 12, line 60, for "homochola5,7-" should read -- homochola-5,7- --. Column 13, line 12, for "3β-25" should read -- 3β,25 --. Column 14, line 9, for "11.31" should read -- 11.13 --. Column 14, line 24, for "-sec-" should read -- -seco- --. Column 14, line 49, for "-sec -" should read -- -seco- --. Column 16, line 6, for "15" should read -- 16 --. Column 16, line 44, for "25-homocholesta" should read -- 24-homocholesta --. Column 16, line 71, for "cholesa" should read -- cholesta --. Column 17, line 26, for "20" should read -- 50 --. Column 17, line 47, for "2β" should read -- 3β --. Column 20, line 22, for "3β,25-diol benzoate"

UNITED STATES PATENT OFFICE
CERTIFICATE OF CORRECTION

Page 2

Patent No. 3,833,622　　　　　　　　　　Dated September 3, 1974

Inventor(s)　John C. Babcock and J Allan Campbell

It is certified that error appears in the above-identified patent and that said Letters Patent are hereby corrected as shown below:

should read -- 3β,25-diol 25-benzoate --. Column 21, line 41, for "-5-(10)" should read -- -5(10) --. Column 25, line 3, for "adding" should read -- added --.

Signed and sealed this 28th day of January 1975.

(SEAL)
Attest:

McCOY M. GIBSON JR.　　　　　　　C. MARSHALL DANN
Attesting Officer　　　　　　　　Commissioner of Patents